US009560276B2

(12) United States Patent
Ju et al.

(10) Patent No.: US 9,560,276 B2
(45) Date of Patent: Jan. 31, 2017

(54) VIDEO RECORDING METHOD OF RECORDING OUTPUT VIDEO SEQUENCE FOR IMAGE CAPTURE MODULE AND RELATED VIDEO RECORDING APPARATUS THEREOF

(71) Applicant: MEDIATEK INC., Hsin-Chu (TW)

(72) Inventors: Chi-Cheng Ju, Hsinchu (TW);
Ding-Yun Chen, Taipei (TW);
Cheng-Tsai Ho, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 13/891,196

(22) Filed: May 10, 2013

(65) Prior Publication Data
US 2013/0315556 A1 Nov. 28, 2013

Related U.S. Application Data

(60) Provisional application No. 61/651,499, filed on May 24, 2012.

(51) Int. Cl.
*H04N 5/77* (2006.01)
*H04N 5/232* (2006.01)
(Continued)

(52) U.S. Cl.
CPC ............ *H04N 5/23248* (2013.01); *G06T 3/40* (2013.01); *G06T 3/4007* (2013.01); *G06T 3/4023* (2013.01); *G06T 5/003* (2013.01); *G06T 7/0002* (2013.01); *H04N 5/23222* (2013.01); *H04N 5/23254* (2013.01); *H04N 5/23293* (2013.01); *H04N 5/772* (2013.01); *H04N 9/79* (2013.01); *G06T 3/4053* (2013.01); *G06T 2207/10016* (2013.01); *G06T 2207/20192* (2013.01);
(Continued)

(58) Field of Classification Search
CPC H04N 5/23222; H04N 5/23248; H04N 5/765; H04N 5/772; H04N 5/77; H04N 5/907; H04N 7/181; H04N 9/79; G06T 7/0002
USPC ........................................................ 386/224
See application file for complete search history.

(56) References Cited

U.S. PATENT DOCUMENTS 4,733,300 A 3/1988 Sugiyama
6,058,248 A 5/2000 Atkins
(Continued)

FOREIGN PATENT DOCUMENTS

CN 101115148 A 1/2008
CN 101149462 A 3/2008
(Continued)

*Primary Examiner* — William Tran
(74) *Attorney, Agent, or Firm* — Winston Hsu; Scott Margo

(57) ABSTRACT

An exemplary video recording method of recording an output video sequence for an image capture module includes at least the following steps: deriving a first video sequence from an input video sequence generated by the image capture module, wherein the first video sequence is composed of a plurality of video frames; calculating an image quality metric value for each of the video frames of the first video sequence; referring to the image quality metric value to select or drop each of the video frames of the first video sequence, and accordingly obtaining a second video sequence composed of selected video frames; and generating the recorded output video sequence according to the second video sequence.

12 Claims, 11 Drawing Sheets

(51) Int. Cl.
  *G06T 3/40*  (2006.01)
  *G06T 5/00*  (2006.01)
  *H04N 9/79*  (2006.01)
  *G06T 7/00*  (2006.01)

(52) U.S. Cl.
  CPC .............. *G06T 2207/30168* (2013.01); *G06T 2207/30201* (2013.01)

(56) References Cited

U.S. PATENT DOCUMENTS

| | | | |
|---|---|---|---|
| 6,888,574 | B1 | 5/2005 | Asakura |
| 6,930,752 | B2 | 8/2005 | Baba |
| 7,269,300 | B2 | 9/2007 | Braun |
| 7,545,391 | B2 | 6/2009 | Le Dinh |
| 8,294,748 | B2 | 10/2012 | Stec |
| 8,373,802 | B1 | 2/2013 | Gross |
| 8,736,736 | B2 | 5/2014 | Hoshino |
| 8,787,728 | B2 | 7/2014 | Maruyama |
| 8,848,090 | B2 | 9/2014 | Koguchi |
| 9,001,255 | B2 | 4/2015 | Matsuzawa |
| 2001/0012072 | A1 | 8/2001 | Ueno |
| 2003/0160886 | A1 | 8/2003 | Misawa |
| 2005/0089247 | A1 | 4/2005 | Braun |
| 2006/0139376 | A1 | 6/2006 | Le Dinh |
| 2006/0280427 | A1* | 12/2006 | Snowdon et al. ............ 386/46 |
| 2006/0290796 | A1 | 12/2006 | Nikkanen |
| 2007/0098396 | A1 | 5/2007 | Watanabe |
| 2007/0140675 | A1 | 6/2007 | Yanagi |
| 2008/0024643 | A1 | 1/2008 | Kato |
| 2008/0129854 | A1 | 6/2008 | Onoda |
| 2008/0240563 | A1 | 10/2008 | Takano |
| 2008/0259274 | A1* | 10/2008 | Chinnock .................... 351/206 |
| 2008/0304745 | A1 | 12/2008 | Honma |
| 2009/0009652 | A1 | 1/2009 | Sudo |
| 2009/0122079 | A1 | 5/2009 | Nishioka |
| 2009/0213263 | A1 | 8/2009 | Watanabe |
| 2009/0284585 | A1 | 11/2009 | Tsai |
| 2010/0110300 | A1* | 5/2010 | Ueno et al. .................. 348/625 |
| 2010/0173678 | A1 | 7/2010 | Kim |
| 2010/0215348 | A1* | 8/2010 | Saito ............................ 386/117 |
| 2011/0018970 | A1 | 1/2011 | Wakabayashi |
| 2011/0084962 | A1 | 4/2011 | Kim |
| 2011/0141486 | A1 | 6/2011 | Wada |
| 2011/0149029 | A1* | 6/2011 | Kellerman et al. ............ 348/43 |
| 2011/0158623 | A1 | 6/2011 | Cheng |
| 2011/0301980 | A1* | 12/2011 | Martucci et al. ................ 705/3 |
| 2011/0311147 | A1 | 12/2011 | Pahalawatta |
| 2012/0019677 | A1* | 1/2012 | Wong et al. ................ 348/208.4 |
| 2012/0268641 | A1 | 10/2012 | Kazama |
| 2013/0002814 | A1 | 1/2013 | Park |
| 2013/0033615 | A1 | 2/2013 | Ecrement |
| 2013/0106913 | A1* | 5/2013 | Edmiston ................ G06F 3/14 345/660 |
| 2013/0194395 | A1 | 8/2013 | Hannuksela |
| 2013/0300900 | A1* | 11/2013 | Pfister et al. ................. 348/239 |

FOREIGN PATENT DOCUMENTS

| | | |
|---|---|---|
| CN | 101266650 A | 9/2008 |
| CN | 102096464 A | 6/2011 |
| CN | 102317974 A | 1/2012 |
| CN | 102375992 A | 3/2012 |
| EP | 0874330 A2 | 10/1998 |
| TW | 200947355 A | 11/2009 |

* cited by examiner

VIDEO RECORDING METHOD OF RECORDING OUTPUT VIDEO SEQUENCE FOR IMAGE CAPTURE MODULE AND RELATED VIDEO RECORDING APPARATUS THEREOF

CROSS REFERENCE TO RELATED APPLICATIONS

This application claims the benefit of U.S. provisional application No. 61/651,499, filed on May 24, 2012 and incorporated herein by reference.

BACKGROUND

The disclosed embodiments of the present invention relate to video recording, and more particularly, to a video recording method of recording an output video sequence for an image capture module and related video recording apparatus thereof.

Camera modules have become popular elements used in a variety of applications. For example, a smartphone is typically equipped with a camera module, thus allowing a user to easily and conveniently take pictures by using the smartphone. However, due to inherent characteristics of the smartphone, the smartphone is prone to generate blurred images. For example, the camera aperture and/or sensor size of the smartphone is typically small, which leads to a small amount of light arriving at each pixel in camera sensor. As a result, the image quality may suffer from the small camera aperture and/or sensor size.

Besides, due to lightweight and portability of the smartphone, the smartphone tends to be affected by hand shake. Specifically, the shake of the smartphone will last for a period of time. Hence, any picture taken during this period of time would be affected by the hand shake. An image deblurring algorithm may be performed upon the blurred images. However, the computational complexity of the image deblurring algorithm is very high, resulting in considerable power consumption. Besides, artifact will be introduced if the image deblurring algorithm is not perfect.

Moreover, a camera module with an optical image stabilizer (OIS) is expensive. Hence, the conventional smartphone is generally equipped with a digital image stabilizer (i.e., an electronic image stabilizer (EIS)). The digital image stabilizer can counteract the motion of images, but fails to prevent image blurring.

In addition to the camera shake, the movement of a target object within a scene to be captured may cause the captured image to have blurry image contents. For example, considering a case where the user wants to use the smartphone to take a picture of a child, the captured image may have a blurry image content of the child if the child is still when the user is going to touch the shutter/capture button and then suddenly moves when the user actually touches the shutter/capture button.

As a result, when the camera module is affected by hand shake and/or there are moving objects within the scene to be captured, the video recording result would include video frames with bad quality.

Furthermore, it is possible that a target frame rate of an output video sequence is different from a frame rate of an input video sequence. For one example, an input video sequence may be adjusted by dropping video frames with bad quality, which leads to an output video sequence with a lower frame rate. For another example, the camera module may have the image capture capability higher or lower than the image capture capability needed for generating an output video sequence with a desired frame rate. For yet another example, as the camera aperture and/or sensor size of the smartphone is typically small, an extended exposure time may be used for brightness enhancement. As a result, an input video sequence with a lower frame rate is generated correspondingly.

Thus, there is a need for an innovative video recording design which is capable of generating an output video sequence which has a desired frame rate and is composed of video frames with good quality.

SUMMARY

In accordance with exemplary embodiments of the present invention, a video recording method of recording an output video sequence for an image capture module and related video recording apparatus thereof are proposed to solve the above-mentioned problem.

According to a first aspect of the present invention, an exemplary video recording method of recording an output video sequence for an image capture module is disclosed. The exemplary video recording method includes at least the following steps: deriving a first video sequence from an input video sequence generated by the image capture module, wherein the first video sequence is composed of a plurality of video frames; calculating an image quality metric value for each of the video frames of the first video sequence; referring to the image quality metric value to select or drop each of the video frames of the first video sequence, and accordingly obtaining a second video sequence composed of selected video frames; and generating the recorded output video sequence according to the second video sequence.

According to a second aspect of the present invention, an exemplary video recording method of recording an output video sequence for an image capture module is disclosed. The exemplary video recording method includes at least the following steps: deriving a first video sequence from an input video sequence generated by the image capture module; obtaining a second video sequence by performing video frame interpolation upon the first video sequence, wherein a frame rate of the second video sequence is higher than a frame rate of the first video sequence; and recording the second video sequence as the output video sequence.

According to a third aspect of the present invention, an exemplary video recording apparatus of recording an output video sequence for an image capture module is disclosed. The exemplary video recording apparatus includes an input circuit, an image quality estimation circuit, a selection circuit, and an output circuit. The input circuit is arranged for deriving a first video sequence from an input video sequence generated by the image capture module, wherein the first video sequence is composed of a plurality of video frames. The image quality estimation circuit is arranged for calculating an image quality metric value for each of the video frames of the first video sequence. The selection circuit is arranged for referring to the image quality metric value to select or drop each of the video frames of the first video sequence, and accordingly obtaining a second video sequence composed of selected video frames. The output circuit is arranged for generating the recorded output video sequence according to the second video sequence.

According to a fourth aspect of the present invention, an exemplary video recording apparatus of recording an output video sequence for an image capture module is disclosed. The exemplary video recording apparatus includes an input circuit, an interpolation circuit, and an output circuit. The input circuit is arranged for deriving a first video sequence from an input video sequence generated by the image capture module. The interpolation circuit is arranged for obtaining a second video sequence by performing video frame interpolation upon the first video sequence, wherein a frame rate of the second video sequence is higher than a frame rate of the first video sequence. The output circuit is arranged for recording the second video sequence as the output video sequence.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to use video frame interpolation to create new video frames with better quality and/or to create new video frames to make the recorded output video sequence have a target frame rate. For example, an input video sequence is first processed such that video frames with better quality are selected and video frames with worse quality are dropped/unselected, and then video frame interpolation is performed based on at least the selected video frames with better quality to generate an output video sequence having a target frame rate. For another example, an input video sequence with a lower frame rate is generated due to an extended exposure time. Hence, video frame interpolation is applied to the input video sequence to generate an output video sequence with a target frame rate. Further details are described as below.

Figure 1:
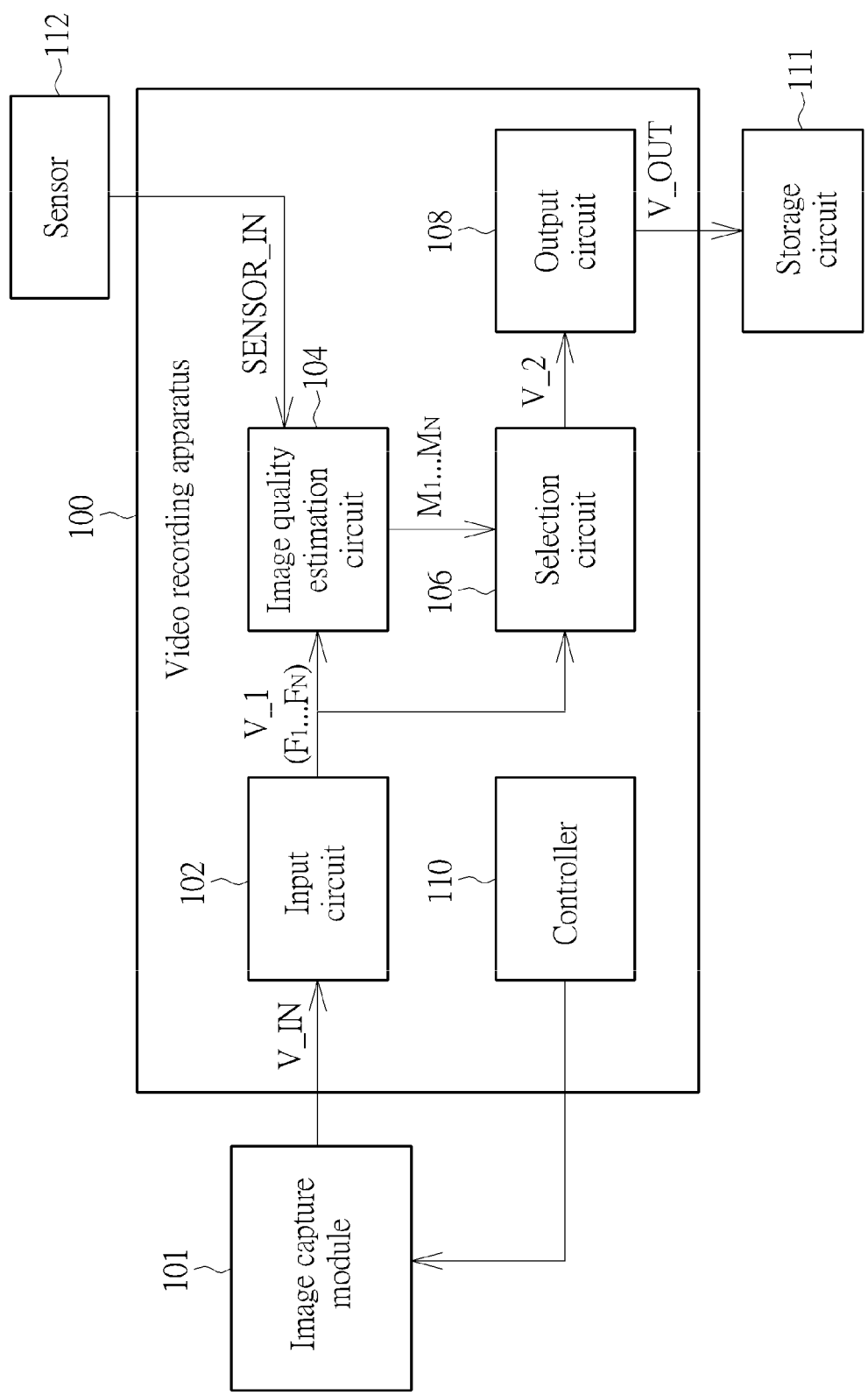
FIG. 1 is a block diagram illustrating a video recording apparatus according to a first exemplary embodiment of the present invention.

FIG. 1 is a block diagram illustrating a video recording apparatus according to a first exemplary embodiment of the present invention. The video recording apparatus 100 is used to record an output video sequence V_OUT for an image capture module (e.g., a camera module) 101. The video recording apparatus 100 and the image capture module 101 may be at least a portion (i.e., part or all) of an electronic device. For example, the video recording apparatus 100 and the image capture module 101 may be implemented in a portable device such as a smartphone or a digital camera. The image capture module 101 has the image capture capability, and may operate under a video recording mode to generate an input video sequence V_IN to the video recording apparatus 100, where the input video sequence V_IN is composed of a plurality of consecutive video frames (i.e., captured images successively generated by the image capture module 101).

In this embodiment, the video recording apparatus 100 includes, but is not limited to, an input circuit 102, an image quality estimation circuit 104, a selection circuit 106, an output circuit 108, and a controller 110. The input circuit 102 is coupled to the image capture module 101, and arranged for deriving a first video sequence V_1 from the input video sequence V_IN generated by the image capture module 101, where the first video sequence V_1 is composed of a plurality of video frames $F_1$-$F_N$. In one exemplary design, the input video sequence V_IN may directly serve as the first video sequence V_1. Specifically, when a frame rate (e.g., frames per second (FPS)) of the input video sequence V_IN is higher than a target frame rate of the output video sequence V_OUT to be recorded, the input circuit 102 may directly output the input video sequence V_IN as the first video sequence V_1. For example, the frame rate of the input video sequence V_IN may be 60 Hz or 120 Hz, and the target frame rate of the output video sequence V_OUT may be 30 Hz. In another exemplary design, the input circuit 102 may perform video frame interpolation upon the input video sequence V_IN to generate the first video sequence V_1 such that the frame rate of the first video sequence V_1 is higher than the frame rate of the input video sequence V_IN. Specifically, when the frame rate of the input video sequence V_IN is lower than or equal to the target frame rate of the output video sequence V_OUT to be recorded, the input circuit 102 may output the first video sequence V_1 by adding new video frames to the input video sequence V_IN. For example, the frame rate of the input video sequence V_IN may be 30 Hz or 15 Hz, and the target frame rate of the output video sequence V_OUT may be 30 Hz. Assume that the image capture module 101 employs an image capture rate of 30 Hz under a normal video recording mode. To achieve the input video sequence V_IN with a lower frame rate such as 15 Hz, the controller 110 is configured to control the image capture module 101 to lower the image capture rate and generate the input video sequence V_IN according to the lowered image capture rate.

The image quality estimation circuit 104 is coupled to the input circuit 102, and arranged for calculating an image quality metric value $M_1$-$M_N$ for each of the video frames $F_1$-$F_N$. For example, regarding each of the video frames $F_1$-$F_N$, the image quality estimation circuit 104 may determine the corresponding image quality metric value $M_1$-$M_N$ by evaluating a sharpness value, a blur value or a noise level of the video frame. Each of the calculated sharpness value, the calculated blur value and the calculated noise level may serve as an indicator of the image quality. A larger sharpness value is indicative of better image quality, and a smaller sharpness value is indicative of worse image quality. A smaller blur value is indicative of better image quality, and a larger blur value is indicative of worse image quality. A lower noise level is indicative of better image quality, and a higher noise level is indicative of worse image quality.

In one exemplary design, the image quality estimation circuit 104 may process the whole video frame to estimate the sharpness value/blur value as the image quality metric value indicative of the image quality of the video frame. In another exemplary design, the image quality estimation circuit 104 may only process a selected region of a video frame (e.g., a face region having one or more face images detected in the video frame, or a fixed specific region located in the video frame) to estimate the sharpness value/blur value as the image quality metric value indicative of the image quality of the video frame.

In another exemplary design, the image quality estimation circuit 104 may calculate image quality metric values $M_1$-$M_N$ for video frames $F_1$-$F_N$ by referring to a sensor input SENSOR_IN generated from the sensor 112. For example, the sensor 112 may be a G-sensor or a Gyro sensor implemented in the smartphone. Hence, the sensor input SENSOR_IN is indicative of a movement status associated with the smartphone, especially a movement status of the image capture module 101. In other words, a sensor value included in the sensor input SENSOR_IN for each of the video frames $F_1$-$F_N$ may be directly used by the image quality estimation circuit 104 to serve as an image quality metric value of the video frame.

The selection circuit 106 is coupled to the image quality estimation circuit 104 and the input circuit 102, and arranged for referring to each of the image quality metrics value $M_1$-$M_N$ to select or drop each of the video frames $F_1$-$F_N$ of the first video sequence V_1, and accordingly obtaining a second video sequence V_2 composed of selected video frames. In a first exemplary implementation, the selection circuit 106 determines whether a video frame (e.g., $F_1$) should be selected or dropped based on an image quality metric value (e.g., $M_1$ corresponding to the video frame (e.g., $F_1$). For example, the selection circuit 106 compares each of the image quality metric values $M_1$-$M_N$ with a predetermined threshold to judge the image quality of each of the video frames $F_1$-$F_N$. In a case where an image quality metric value is set by a larger value when a larger sharpness value, a smaller blur value or a lower noise level is calculated, the video frame is regarded as having better quality if the corresponding image quality metric value exceeds the predetermined threshold, and is regarded as having worse quality if the corresponding image quality metric value does not exceed the predetermined threshold. Hence, the selection circuit 106 generates the second input video sequence V_2 by selecting video frames with better quality and dropping video frames with worse quality. In this way, the selection circuit 106 refers to quality of video frames to convert one video sequence with a first frame rate (e.g., 120 Hz or 60 Hz) into another video sequence with a second frame rate (e.g., 30 Hz) lower than the first frame rate.

In a second exemplary implementation, the selection circuit 106 may be configured to determine whether a current video frame (e.g., $F_K$) should be selected or dropped based on an image quality metric value (e.g., $M_K$) corresponding to the current video frame (e.g., $F_K$) and image quality metric value(s) (e.g., $M_{K-1}$ and/or $M_{K+1}$) of at least one adjacent video frame (e.g., $F_{K-1}$ and/or $F_{K+1}$). For example, the selection circuit 106 compares the image quality metric values $M_{K-1}$, $M_K$, $M_{K+1}$ with a predetermined threshold to judge the image quality of the current video frame $F_K$ and the adjacent video frames $F_{K-1}$, $F_{K+1}$. When the comparison result indicates that the current video frame $F_K$ has better quality and the adjacent video frames $F_{K-1}$, $F_{K+1}$ have better or worse quality, the current video frame $F_K$ is selected by the selection circuit 106. When the comparison result indicates that the current video frame $F_K$ and the adjacent video frames $F_{K-1}$, $F_{K+1}$ have worse quality but the quality of the current video frame $F_K$ is better than that of the adjacent video frames $F_{K-1}$, $F_{K+1}$, the current video frame $F_K$ is selected by the selection circuit 106. When the comparison result indicates that the current video frame $F_K$ and the adjacent video frames $F_{K-1}$, $F_{K+1}$ have worse quality and the quality of the current video frame $F_K$ is not better than that of the adjacent video frames $F_{K-1}$, $F_{K+1}$, the current video frame $F_K$ is dropped/unselected by the selection circuit 106. The same selection rule is applied to the video frames $F_1$-$F_N$ of the first video sequence V_1 one by one. In this way, the same objective of referring to quality of video frames to convert one video sequence with a first frame rate (e.g., 120 Hz or 60 Hz) into another video sequence with a second frame rate (e.g., 30 Hz) lower than the first frame rate is achieved by the selection circuit 106.

The output circuit 108 is coupled between the selection circuit 106 and a storage device (e.g., a non-volatile memory) 111, and arranged for generating the output video sequence V_OUT to the storage device 111 according to the second video sequence V_2, where the output video sequence V_OUT is recorded in the storage device 111 for further processing. In one exemplary design, the second video sequence V_2 may directly serve as the output video sequence V_OUT. For example, when the frame rate of the second video sequence V_2 is equal to the target frame rate of the output video sequence V_OUT to be recorded, the output circuit 108 may directly output the second video sequence V_2 as the output video sequence V_OUT. In another exemplary design, the output circuit 108 may perform video frame interpolation upon the second video sequence V_2 to generate the output video sequence V_OUT, where the frame rate of the output video sequence V_OUT is higher than the frame rate of the second video sequence V_2. For example, when the frame rate of the second video sequence V_2 is lower than the target frame rate of the output video sequence V_OUT to be recorded, the output circuit 108 may perform video frame interpolation upon the second video sequence V_2 composed of selected video frames to thereby generate the output video sequence V_OUT composed of interpolated new video frames and all of the selected video frames. In yet another exemplary design, the output circuit 108 may generate the output video sequence V_OUT composed of interpolated new video frames and a portion of the selected video frames by performing video frame interpolation upon the second video sequence V_2 and dropping at least one video frame of the second video sequence V_2, where the frame rate of the output video sequence V_OUT may be equal to, higher than or lower than the frame rate of the second video sequence V_2. For example, when the frame rate of the second video sequence V_2 is equal to the target frame rate of the output video sequence V_OUT to be recorded but the interval between image capture timing of any consecutive video frames of the second video sequence V_2 is not equal to the expected interval between image display timing of consecutive video frames, the output circuit 108 may perform video frame interpolation upon the second video sequence V_2 to generate the output video sequence V_OUT. In yet another exemplary design, the output circuit 108 may directly drop at least one video frame of the second video sequence V_2 to generate the output video sequence V_OUT, where the frame rate of the output video sequence V_OUT is lower than the frame rate of the second video sequence V_2. For example, when video interpolation is performed at the input circuit 102 to make the frame rate of the first video sequence V_1 much higher than the target frame rate of the output video sequence V_OUT, it is possible that the frame rate of the second video sequence V_2 is still higher than the target frame rate of the output video sequence V_OUT. Hence, the output circuit 108 may be configured to simply drop video frame(s) of the second video sequence V_2 without performing additional video interpolation upon the second video sequence V_2. The same objective of generating an output video sequence with a desired frame rate is achieved.

For better understanding of technical features of the present invention, several video recording examples based on the proposed video recording apparatus 100 are given as below.

Figure 2:
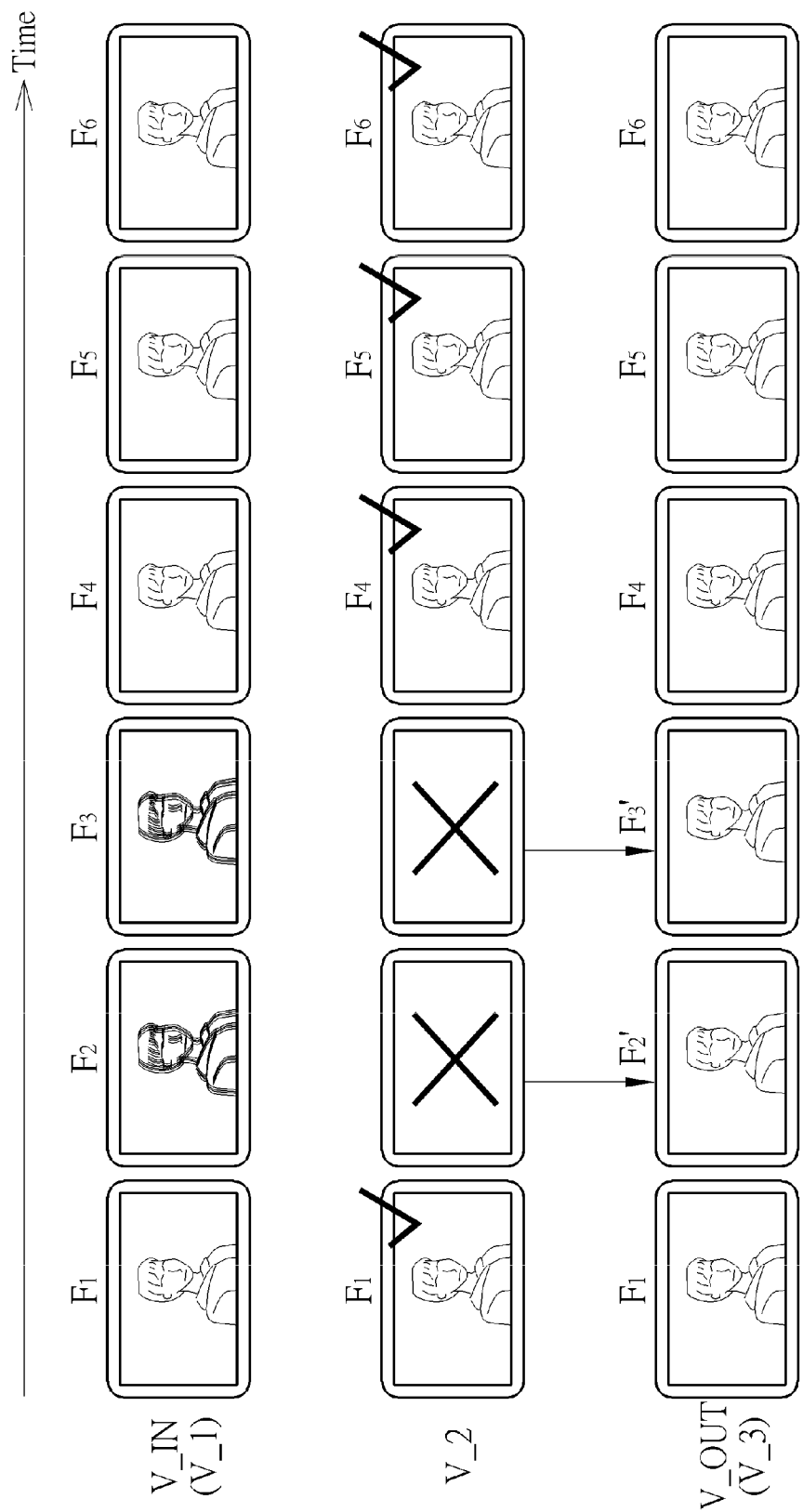
FIG. 2 is a diagram illustrating a first video recording example based on the proposed video recording apparatus shown in FIG. 1.

FIG. 2 is a diagram illustrating a first video recording example based on the proposed video recording apparatus 100 shown in FIG. 1. In this example, the input circuit 102 directly outputs the input video sequence V_IN as the first video sequence V_1 composed of video frames $F_1$-$F_6$. As the video frames $F_2$ and $F_3$ include blurry image contents, the corresponding image quality metric values calculated by the image quality estimation circuit 104 would indicate that the video frames $F_2$ and $F_3$ have worse quality. Thus, the selection circuit 106 generates the second video sequence V_2 by selecting video frames $F_1$, $F_4$-$F_6$ and dropping video frames $F_2$-$F_3$. In this example, the target frame rate of the output video sequence V_OUT is required to be equal to the frame rate of the input video sequence V_IN. Hence, the output circuit 108 performs video frame interpolation to create new video frames $F_2'$-$F_3'$ inserted between the video frames $F_1$ and $F_4$. In one exemplary design, the video frame $F_2'/F_3'$ is interpolated based on at least one of the adjacent selected video frames $F_1$ and $F_4$ in the second video sequence V_2. In another exemplary design, the video frame $F_2'/F_3'$ is interpolated based on at least one video frame (e.g., $F_2/F_3$) in the first video sequence V_1 and at least one video frame (e.g., $F_1$ and/or $F_4$) in the second video sequence V_2. As the video frame $F_2/F_3$ in the first video sequence V_1 (i.e., the original image content captured at the image capture timing to which the video frame $F_2'/F_3'$ corresponds) is referenced, the video frame $F_2'/F_3'$ may have better quality. To put it simply, the output circuit 108 obtains the third video sequence V_3 by performing video frame interpolation upon the second video sequence V_2, and records the third video sequence V_3 as the output video sequence V_OUT, where the frame rate of the output video sequence V_OUT is higher than the frame rate of the second video sequence V_2. As the video frame selection is based on the image quality, the output video sequence V_OUT with better quality is generated and recorded.

Figure 3:
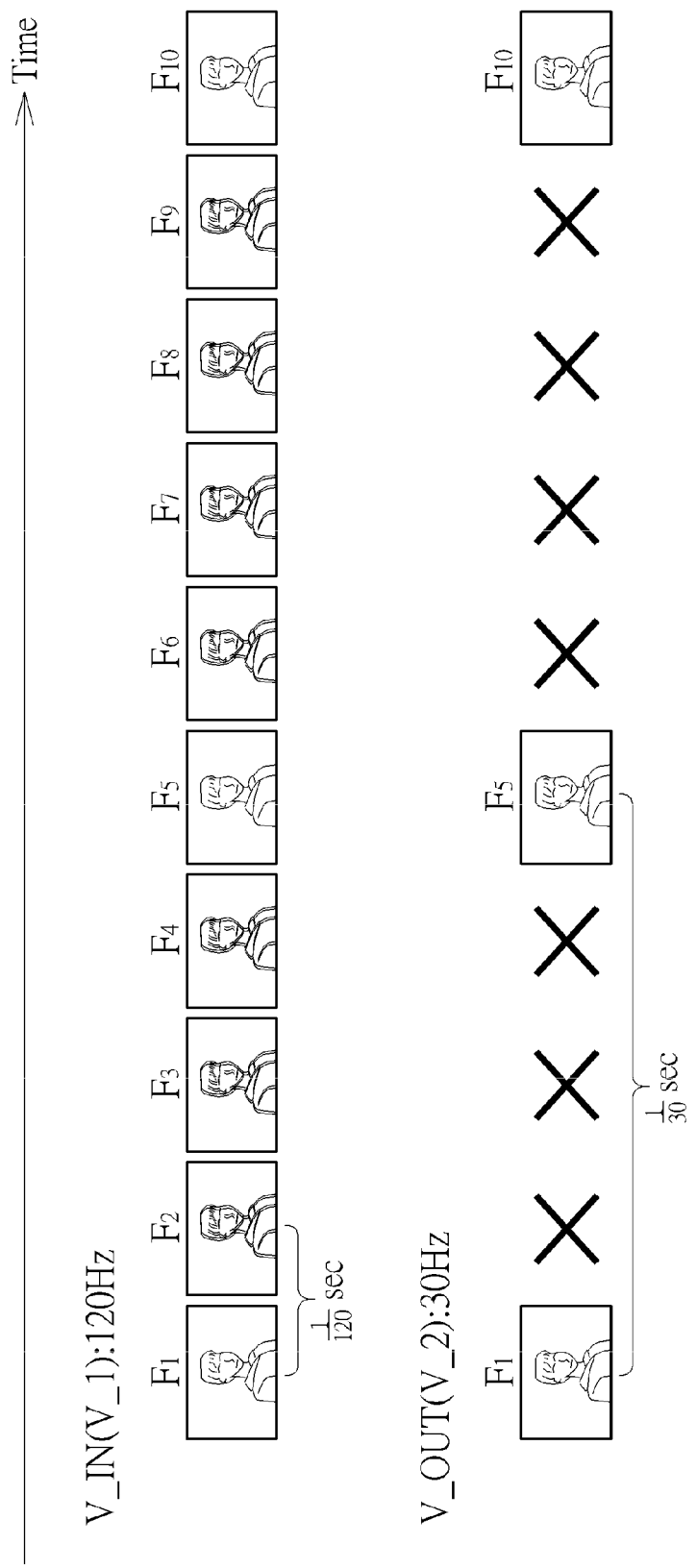
FIG. 3 is a diagram illustrating a second video recording example based on the proposed video recording apparatus shown in FIG. 1.

FIG. 3 is a diagram illustrating a second video recording example based on the proposed video recording apparatus 100 shown in FIG. 1. In this example, the input circuit 102 directly outputs the input video sequence V_IN as the first video sequence V_1 composed of video frames $F_1$-$F_{10}$, where the frame rate of the input video sequence V_IN is 120 Hz. As the video frames $F_2$-$F_4$ and $F_6$-$F_9$ include blurry image contents, the corresponding image quality metric values calculated by the image quality estimation circuit 104 would indicate that the video frames $F_2$-$F_4$ and $F_6$-$F_9$ have worse quality. Thus, the selection circuit 106 generates the second video sequence V_2 by selecting video frames $F_1$, $F_5$, $F_{10}$ and dropping video frames $F_2$-$F_4$, $F_6$-$F_9$. In this example, the target frame rate of the output video sequence V_OUT is 30 Hz, which is lower than the frame rate of the input video sequence V_IN. As the frame rate of the second video sequence V_2 is equal to the target frame rate of the output video sequence V_OUT due to the proposed image quality based video frame selection scheme, the output circuit 108 directly outputs the second video sequence V_2 as the output video sequence V_OUT without performing the aforementioned video frame interpolation. As the video frame selection is based on the image quality, the output video sequence V_OUT with better quality is generated and recorded.

Figure 4:
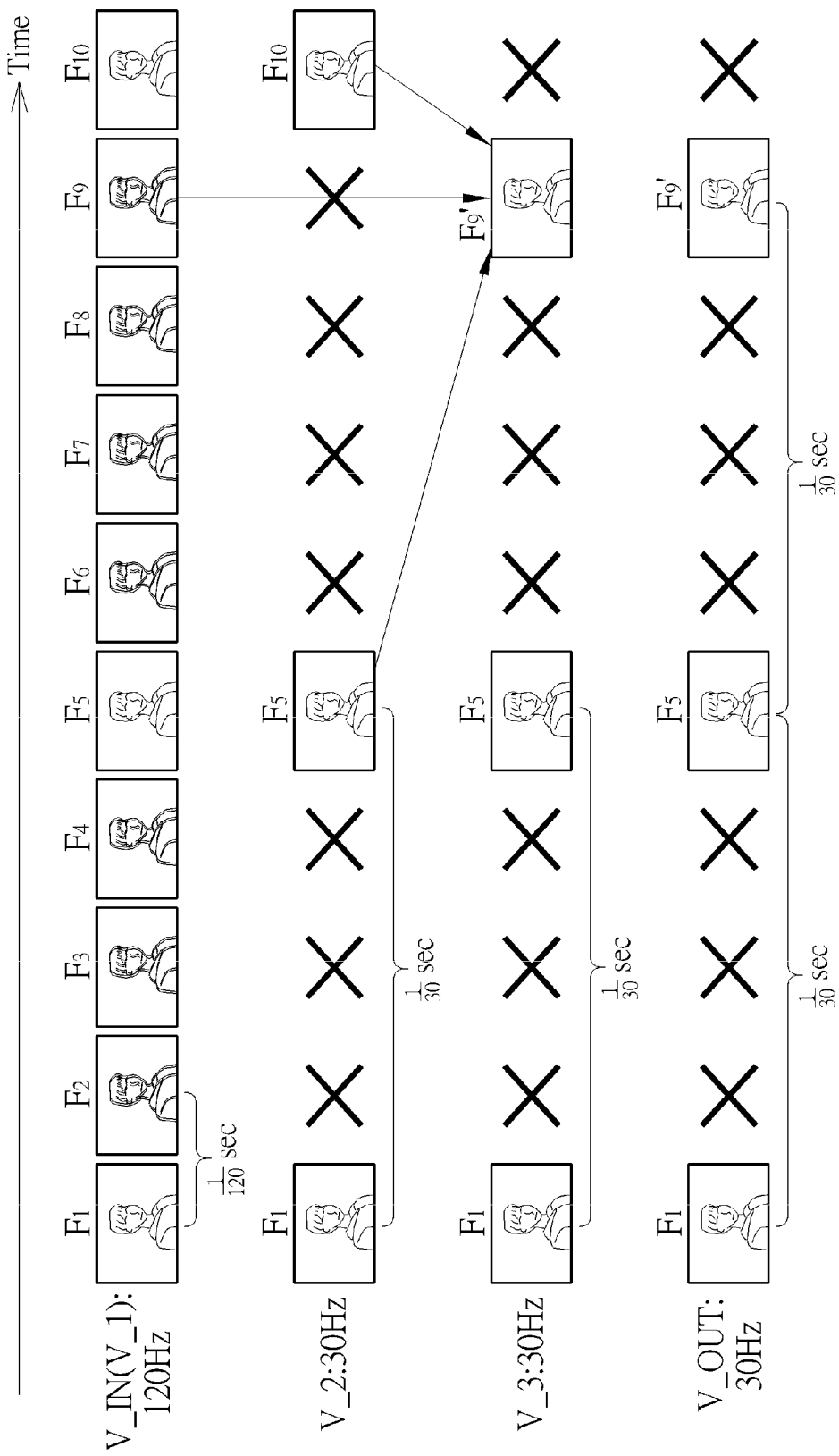
FIG. 4 is a diagram illustrating a third video recording example based on the proposed video recording apparatus shown in FIG. 1.

FIG. 4 is a diagram illustrating a third video recording example based on the proposed video recording apparatus 100 shown in FIG. 1. In this example, the input circuit 102 directly outputs the input video sequence V_IN as the first video sequence V_1 composed of video frames $F_1$-$F_{10}$, where the frame rate of the input video sequence V_IN is 120 Hz. As the video frames $F_2$-$F_4$ and $F_6$-$F_9$ include blurry image contents, the corresponding image quality metric values calculated by the image quality estimation circuit 104 would indicate that the video frames $F_2$-$F_4$ and $F_6$-$F_9$ have worse quality. Thus, the selection circuit 106 generates the second video sequence V_2 by selecting video frames $F_1$, $F_5$, $F_{10}$ and dropping video frames $F_2$-$F_4$, $F_6$-$F_9$. In this example, the target frame rate of the output video sequence V_OUT is 30 Hz, which is lower than the frame rate of the input video sequence V_IN. Though the frame rate of the second video sequence V_2 is equal to the target frame rate of the output video sequence V_OUT due to the proposed image quality based video frame selection scheme, the interval between the image capture timing of the video frames $F_5$ and $F_{10}$ is not equal to an expected interval between image display timing of consecutive video frames (e.g., 1/30 second). Therefore, the output circuit 108 obtains a third video sequence V_3 by performing video frame interpolation upon the second video sequence V_2 and dropping at least one video frame of the second video sequence V_2, where the frame rate of the second video sequence V_2 is equal to the frame rate of the third video sequence V_3. As shown in FIG. 4, the third video sequence V_3 is generated by removing the video frame $F_{10}$ from the second video sequence V_2 and adding a new video frame $F_9'$ to the second video sequence V_2, where the interval between the image capture timing of the video frames $F_5$ and $F_9'$ is equal to an expected interval between image display timing of consecutive video frames (e.g., 1/30 second). In one exemplary design, the video frame $F_9'$ is interpolated based on at least one of the adjacent selected video frames $F_5$ and $F_{10}$ in the second video sequence V_2. The video frame interpolation may adjust the weighting factors of the referenced video frames to obtain an interpolated video frame with good quality. Alternatively, the video frame $F_9'$ may be generated by referring to an available video frame of the second video sequence V_2. For example, an extrapolation algorithm may be employed by the output circuit 108 to derive the video frame $F_9'$ from the selected video frame $F_1/F_5$ (when a real-time or non-real-time manner is employed) or the selected video frame $F_{10}$ (when a non-real-time manner is employed). In another exemplary design, the video frame $F_9'$ is interpolated based on at least one video frame (e.g., $F_9$) in the first video sequence V_1 and at least one video frame (e.g., $F_5$ and/or $F_{10}$) in the second video sequence V_2. As the video frame $F_9$ in the first video sequence V_1 (i.e., the original image content captured at the image capture timing to which the video frame $F_9'$ corresponds) is referenced, the video frame $F_9'$ may have better quality. After obtaining the third video sequence V_3, the output circuit 108 records the third video sequence V_3 as the output video sequence V_OUT. As the video frame selection is based on the image quality, the output video sequence V_OUT with better quality is generated and recorded. In addition, as the video frame interpolation is performed to create video frames corresponding to correct display time, the temporal smoothness of the video playback is improved.

Regarding the example shown in FIG. 4, the video frame $F_9'$ is included in the output video sequence V_OUT, and acts as a substitute of the video frame $F_9$ for providing the required image content at the correct display time. In an alternative design, the output circuit 108 may further compare the quality of the video frame $F_9'$ and the quality of the video frame $F_9$ to determine which one of video frames $F_9$ and $F_9'$ should be included in the output video sequence V_OUT. In a case where the quality of the video frame $F_9'$ is better than that of the video frame $F_9$, the video frame $F_9'$ is selected to be a next video frame of the video frame $F_5$, and used for providing the required image content at the correct display time. In another case where the quality of the video frame $F_9$ is better than that of the video frame $F_9'$, the video frame $F_9$ is selected to be a next video frame of the video frame $F_5$, and used for providing the required image content at the correct display time.

Figure 5:
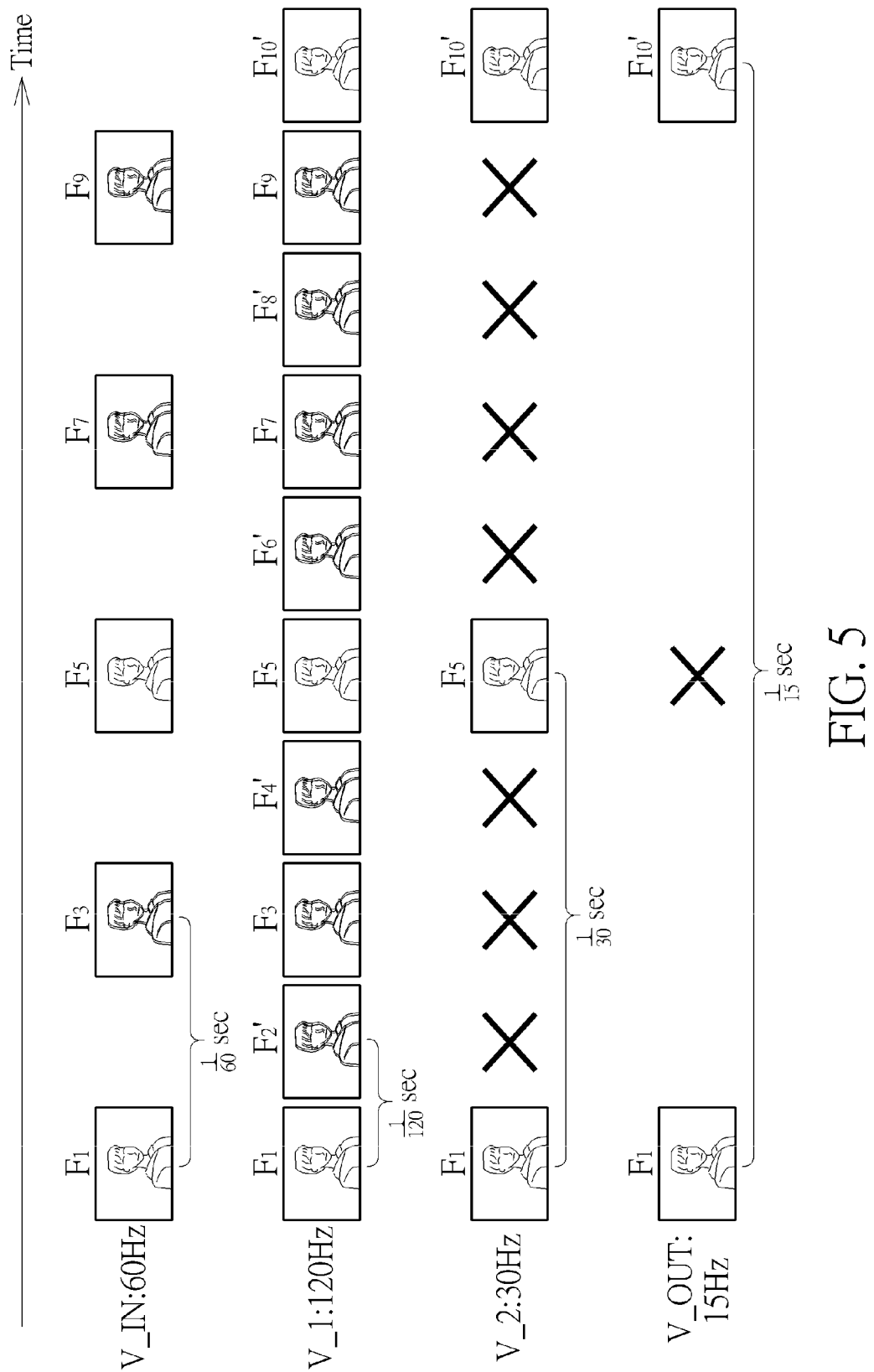
FIG. 5 is a diagram illustrating a fourth video recording example based on the proposed video recording apparatus shown in FIG. 1.

FIG. 5 is a diagram illustrating a fourth video recording example based on the proposed video recording apparatus 100 shown in FIG. 1. In this example, the input circuit 102 performs video interpolation upon the input video sequence V_IN composed of video frames $F_1$, $F_3$, $F_5$, $F_7$, $F_9$, and accordingly generates the first video sequence V_1 composed of video frames $F_1$, $F_2'$, $F_3$, $F_4'$, $F_5$, $F_6'$, $F_7$, $F_8'$, $F_9$, $F_{10}'$, where the frame rate of the input video sequence V_IN is 60 Hz, and the frame rate of the first video sequence V_1 is 120 Hz. As the video frames $F_2'$-$F_4'$ and $F_6'$-$F_9$ include blurry image contents, the corresponding image quality metric values calculated by the image quality estimation circuit 104 would indicate that the video frames $F_2'$-$F_4'$ and $F_6'$-$F_9$ have worse quality. Thus, the selection circuit 106 generates the second video sequence V_2 by selecting video frames $F_1$, $F_5$, $F_{10}'$. In one example, the second video sequence V2 directly serves as the output video sequence V_OUT when the target frame rate of the output video sequence V_OUT is 30 Hz (i.e., the target frame rate of the output video sequence V_OUT is equal to the frame rate of the second video sequence V_2). In another example, the target frame rate of the output video sequence V_OUT is 15 Hz, which is lower than the frame rate of the second video sequence V_2. Hence, no video interpolation is performed by the output circuit 108. The output circuit 108 drops the video frame $F_5$ of the second video sequence V_2, as shown in FIG. 5, to thereby generate the output video sequence V_OUT composed of video frames $F_1$ and $F_{10}'$. As the video frame selection is based on the image quality, the output video sequence V_OUT with better quality is generated and recorded.

Regarding the aforementioned video recording examples, the video frames are selected based on the image quality metric values. However, if there are too many consecutive video frames dropped due to worse quality, the temporal smoothness of the selected video frames would be significantly degraded. Even though the video frame interpolation may be performed upon the selected video frames, the temporal smoothness cannot be effectively improved under the condition that too many consecutive video frames are dropped. To keep the temporal smoothness, the selection circuit 106 may be configured to selects at least one video frame per N consecutive frames of the first video sequence V_1 according to image quality metric values of the N consecutive video frames, where N is a positive integer that is determined based on actual design requirement/consideration. More specifically, a video frame with the best quality among the N consecutive video frames must be selected even though the image quality metric value of this selected video frame does not reach the predetermined threshold. In practice, the value of N may be set according to the frame rates of the input video sequence V_IN and the output video sequence V_OUT. However, this is not meant to be a limitation of the present invention.

Figure 6:
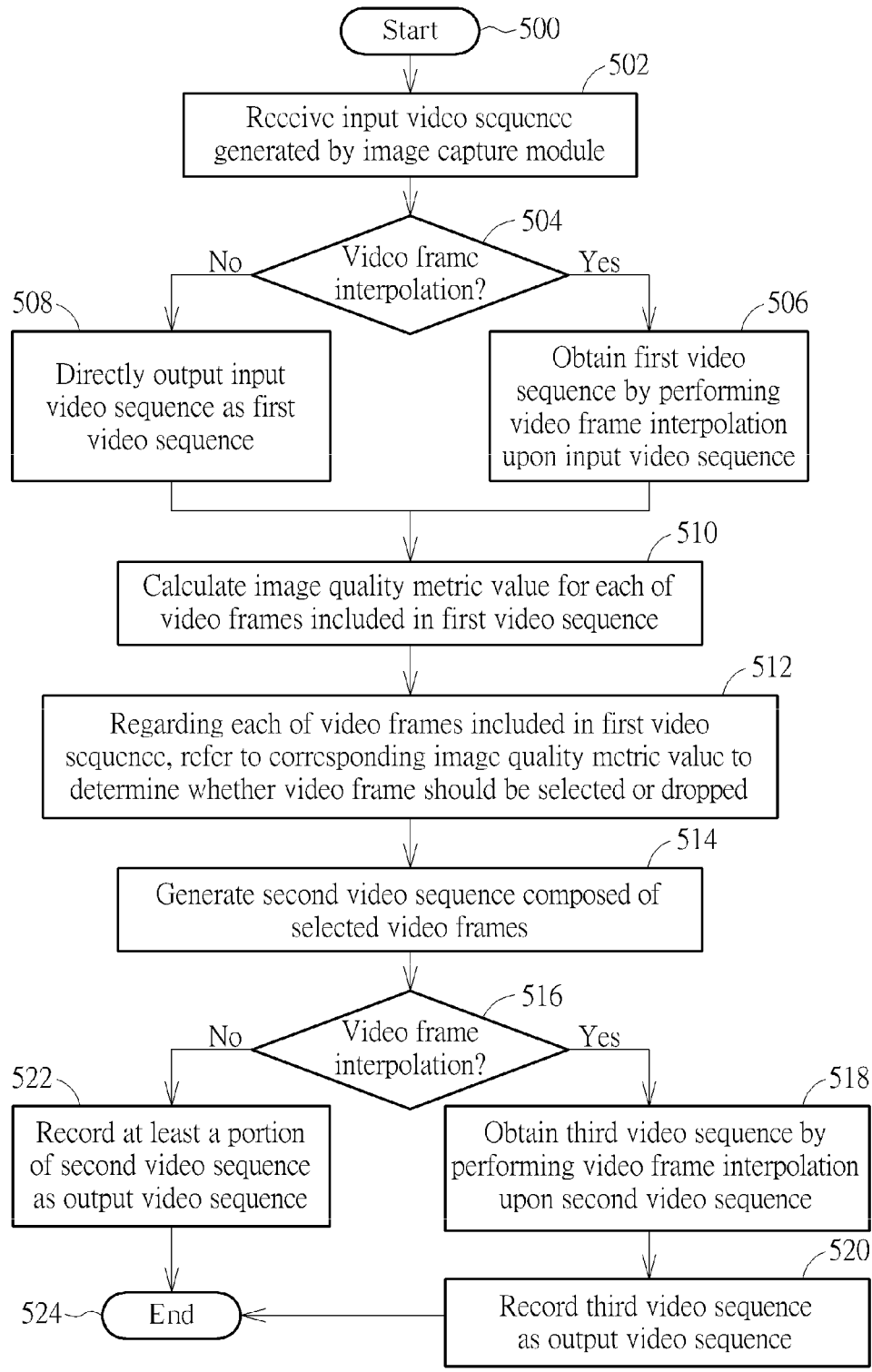
FIG. 6 is a flowchart illustrating a video recording method of recording an output video sequence for an image capture module according to an embodiment of the present invention.

FIG. 6 is a flowchart illustrating a video recording method of recording an output video sequence for an image capture module according to an embodiment of the present invention. The video recording method may be employed by the video recording apparatus 100 shown in FIG. 1. Provided that the result is substantially the same, the steps are not required to be executed in the exact order shown in FIG. 6. The video recording method may include following steps.

Step 500: Start.

Step 502: Receive the input video sequence V_IN generated by the image capture module 101.

Step 504: Check if video frame interpolation should be applied to the input video sequence V_IN. If yes, go to step 506; otherwise, go to step 508.

Step 506: Obtain the first video sequence V_1 by performing video frame interpolation upon the input video sequence V_IN, where the frame rate of the first video sequence V_1 is higher than the frame rate of the input video sequence V_IN. Go to step 510.

Step 508: Directly output the input video sequence V_IN as the first video sequence V_1.

Step 510: Calculate an image quality metric value for each of video frames included in the first video sequence V_1. For example, the image quality metric value may be evaluated using a sharpness value of a blur value derived from at least a portion (i.e., part or all) of the video frame.

Step 512: Regarding each of the video frames included in the first video sequence V_1, refer to the corresponding image quality metric value to determine whether the video frame should be selected or dropped/unselected.

Step 514: Generate the second video sequence V_2 composed of selected video frames.

Step 516: Check if video frame interpolation should be applied to the second video sequence V_2. If yes, go to step 518; otherwise, go to step 522.

Step 518: Obtain the third video sequence V_3 by performing video frame interpolation upon the second video sequence V_2, where the frame rate of the third video sequence V_3 is equal to or higher than the frame rate of the second video sequence V_2.

Step 520: Record the third video sequence V_3 as the output video sequence V_OUT. Go to step 524.

Step 522: Record at least a portion (i.e., part or all) of the second video sequence V_2 as the output video sequence V_OUT. When the frame rate of the second video sequence V_2 is equal to the target frame rate of the output video sequence V_OUT, the second video sequence V_2 directly acts as the output video sequence V_OUT. When the frame rate of the second video sequence V_2 is higher than the target frame rate of the output video sequence V_OUT, at least one video frame of the second video sequence V_2 is dropped to create the output video sequence V_OUT.

Step 524: End.

As a person skilled in the art can readily understand details of each step after reading above paragraphs directed to the video recording apparatus 100, further description is omitted here for brevity.

It should be noted that the video recording method shown in FIG. 6 is for illustrative purposes only, and is not meant to be a limitation of the present invention. That is, one or more steps in FIG. 6 may be omitted. For example, steps 504 and 506 may be omitted in a first alternative design such that step 508 is performed immediately after step 502; steps 504 and 508 may be omitted in a second alternative design such that step 506 is performed immediately after step 502; steps 516, 518, and 520 may be omitted in a third alternative design such that step 522 is performed immediately after step 514; steps 516 and 522 may be omitted in a fourth alternative design such that step 518 is performed immediately after step 514; steps 504, 506, 516 and 522 may be omitted in a fifth alternative design such that step 508 is performed immediately after step 502 and step 518 is performed immediately after step 514; and steps 504, 508, 516, 518 and 520 may be omitted in a sixth alternative design such that step 506 is performed immediately after step 502 and step 522 is performed immediately after step 514.

The video recording method shown in FIG. 6 may be performed in either a real-time manner or a non-real-time manner. In a case where the video recording method shown in FIG. 6 is performed in a real-time manner, each video frame (i.e., each captured image) generated from the image capture module 101 is immediately fed into the input circuit 102 of the video recording apparatus 100. The video recording apparatus 100 is properly designed to operate at a high processing speed. Hence, before the next video frame (i.e., the next captured image) is fed into the input circuit 102 of the video recording apparatus 100, the image quality estimation circuit 104 would calculate an image quality metric value for the current video frame, the selection circuit 106 would refer to the image quality metric value to determine whether the current video frame should be selected or dropped, and the output circuit 108 would selectively output a currently received video frame or perform video interpolation to create a new video frame, where the new video frame is buffered by the output circuit 108 when the current time is not the correct output time, and the unbuffered/ buffered new video frame is outputted from the output circuit 108 when the current time is the correct output time.

In a case where the video recording method shown in FIG. 6 is performed in a non-real-time manner, video frames (i.e., captured images) generated from the image capture module 101 are temporarily stored in a camera buffer. Next, the buffered video frames (i.e., buffered captured images) are fed into the input circuit 102 of the video recording apparatus 100. The video recording apparatus 100 is allowed to operate at a lower processing speed due to the camera buffer. Besides, the video recording apparatus 100 may retrieve a batch of consecutive buffered video frames from the camera buffer. Therefore, the image quality estimation circuit 104 would calculate a plurality of image quality metric values for these video frames. After the image quality metric values are available, the selection circuit 106 starts determining which video frame(s) should be selected or dropped.

Figure 7:
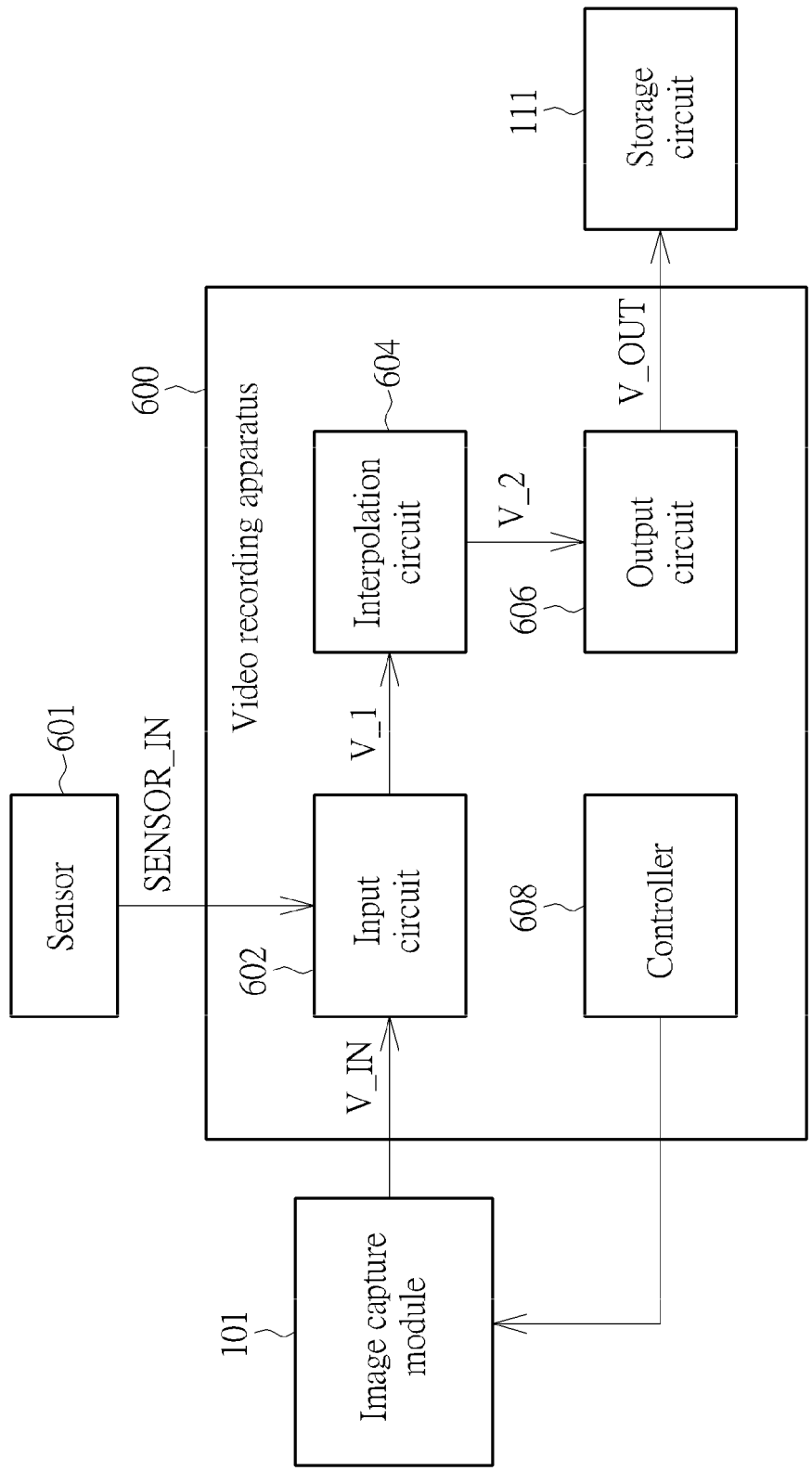
FIG. 7 is a block diagram illustrating a video recording apparatus according to a second exemplary embodiment of the present invention.

FIG. 7 is a block diagram illustrating a video recording apparatus according to a second exemplary embodiment of the present invention. The video recording apparatus 600 is used to record an output video sequence V_OUT for an image capture module (e.g., a camera module) 101. The video recording apparatus 600 and the image capture module 101 may be at least a portion (i.e., part or all) of an electronic device. For example, the video recording apparatus 600 and the image capture module 101 may be implemented in a portable device such as a smartphone or a digital camera. The image capture module 101 has the image capture capability, and may operate under a video recording mode to generate the input video sequence V_IN to the video recording apparatus 600.

In this embodiment, the video recording apparatus 600 includes, but is not limited to, an input circuit 602, an interpolation circuit 604, an output circuit 606, and a controller 608. The input circuit 602 is coupled to the image capture module 101, and arranged for deriving a first video sequence V_1 from the input video sequence V_IN generated by the image capture module 101. In a first exemplary design, the input video sequence V_IN may directly serve as the first video sequence V_1. Specifically, when the frame rate (e.g., frames per second (FPS)) of the input video sequence V_IN is lower than the target frame rate of the output video sequence V_OUT to be recorded, the input circuit 602 may directly output the input video sequence V_IN as the first video sequence V_1. For example, the frame rate of the input video sequence V_IN may be 15 Hz. Assume that the image capture module 101 employs an image capture rate of 30 Hz under a normal video recording mode. To achieve the input video sequence V_IN with the lower frame rate such as 15 Hz, the controller 608 may control the image capture module 101 to lower the image capture rate and generate the input video sequence V_IN according to the lowered image capture rate.

In a second exemplary design, the input circuit 602 may obtain the first video sequence V_1 by periodically selecting one video frame from the input video sequence V_IN, where the frame rate of the input video sequence V_IN is equal to or higher than the frame rate of the first video sequence V_1. In one exemplary design, when the frame rate of the input video sequence V_IN is K, and one video frame is selected from every L consecutive video frames of the input video sequence V_IN to serve as one video frame of the first video sequence V_1, the frame rate of the first video sequence V_1 would be K/L.

In a third exemplary design, the input circuit 602 may obtain the first video sequence V_1 by selecting video frames from the input video sequence V_IN according to a sensor input SENSOR_IN generated by a sensor 601, where the frame rate of the input video sequence V_IN is higher than the frame rate of the first video sequence V_1. For example, the sensor 601 may be a G-sensor or a Gyro sensor implemented in the smartphone. Hence, the sensor input SENSOR_IN is indicative of a movement status associated with the smartphone, especially a movement status of the image capture module 101. In other words, the sensor input SENSOR_IN may directly serve as an indicator of image quality of each of the video frames included in the input video sequence V_IN. Thus, there is no need to calculate any image quality metric value for each video frame in the input video sequence V_IN. When the sensor input SENSOR_IN indicates that video frames are generated under a stable condition, the input circuit 602 selects these video frames. However, when the sensor input SENSOR_IN indicates that video frames are generated under a hand shake condition, the input circuit 602 drops these video frames. In this way, the input circuit 602 is capable of referring to the sensor input SENSOR_IN to convert one video sequence with a first frame rate (e.g., 120 Hz or 60 Hz) into another video sequence with a second frame rate (e.g., 30 Hz) lower than the first frame rate.

The interpolation circuit 604 is coupled to the input circuit 602, and arranged for obtaining a second video sequence V_2 by performing video frame interpolation upon the first video sequence V_1, wherein the frame rate of the second video sequence V_2 is higher than the frame rate of the first video sequence V_1. One objective of using the interpolation circuit 604 is to make the frame rate of the second video sequence V_2 equal to the target frame rate of the output video sequence V_OUT to be recorded. Another objective of using the interpolation circuit 604 is to generate the second video sequence V_2 with better quality, compared to the input video sequence V_IN, by adding new video frames with better quality to the first video sequence V_1.

The output circuit 606 is coupled between the interpolation circuit 604 and the storage device (e.g., a non-volatile memory) 111, and arranged for recording the second video sequence V_2 as the output video sequence V_OUT. For example, the output video sequence V_OUT is recorded in the storage device for further processing.

For better understanding of technical features of the present invention, several video recording examples based on the proposed video recording apparatus 600 are given as below.

Figure 8:
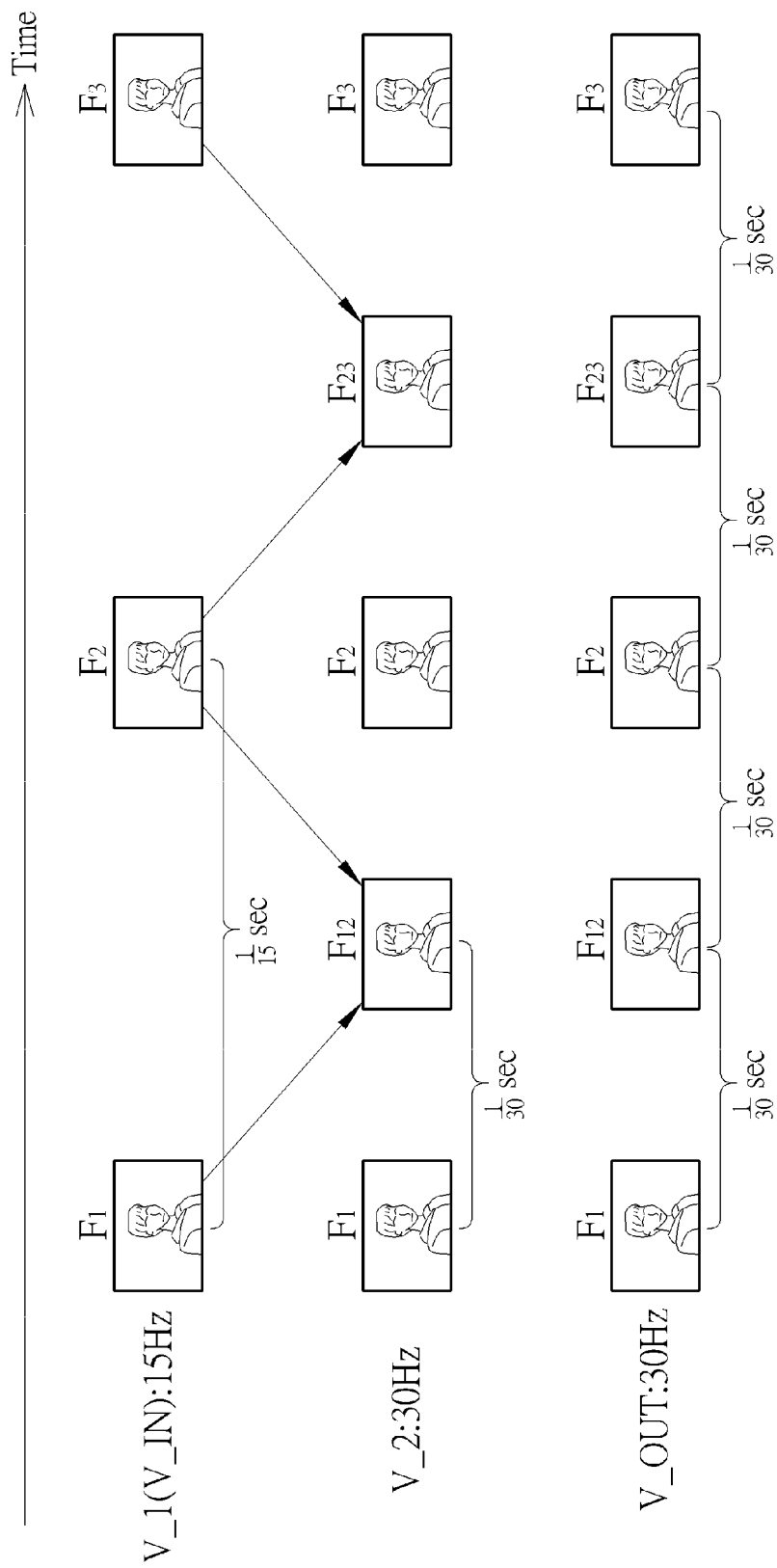
FIG. 8 is a diagram illustrating a first video recording example based on the proposed video recording apparatus shown in FIG. 7.

FIG. 8 is a diagram illustrating a first video recording example based on the proposed video recording apparatus 600 shown in FIG. 7. In this example, the controller 608 controls the image capture module 101 to reduce the image capture rate such that the frame rate of the input video sequence V_IN is 15 Hz which is lower than the target frame rate such as 30 Hz. Besides, the input circuit 602 directly outputs the input video sequence V_IN as the first video sequence V_1. In other words, all video frames $F_1$, $F_2$, $F_3$ included in the input video sequence V_IN are selected by the input circuit 602 as video frames of the first video sequence V_1. As the image capture rate is intentionally reduced, the image quality of each video frame in the input video sequence V_IN is enhanced due to a longer exposure time and a larger amount of light arriving at a camera sensor. To obtain a video sequence with the target frame rate (e.g., 30 Hz), the interpolation circuit 604 therefore performs video frame interpolation to create one new video frame $F_{12}$ inserted between video frames $F_1$ and $F_2$ and create another new video frame $F_{23}$ inserted between video frames $F_2$ and $F_3$, and accordingly generates the second video sequence V_2 with the target frame rate. It should be noted that the video frame interpolation may adjust the weighting factors of the referenced video frames to obtain an interpolated video frame with good quality. Alternatively, an extrapolation algorithm may be employed by the interpolation circuit 604 to create the video frames $F_{12}$ and $F_{23}$ based on an available video frame in the first video sequence V_1. For example, the interpolation circuit 604 derives the video frame $F_{12}$ from the video frame $F_1$ (when a real-time or non-real-time manner is employed) or the video frame $F_2/F_3$ (when a non-real-time manner is employed). Similarly, the interpolation circuit 604 derives the video frame $F_{23}$ from the video frame $F_1/F_2$ (when a real-time or non-real-time manner is employed) or the video frame $F_3$ (when a non-real-time manner is employed). Next, the output circuit 606 records the second video sequence V_2 as the output video sequence V_OUT. As the image capture rate is intentionally reduced to improve quality of the input video sequence V_IN, the output video sequence V_OUT with better quality is generated and recorded by the video recording apparatus 600.

Figure 9:
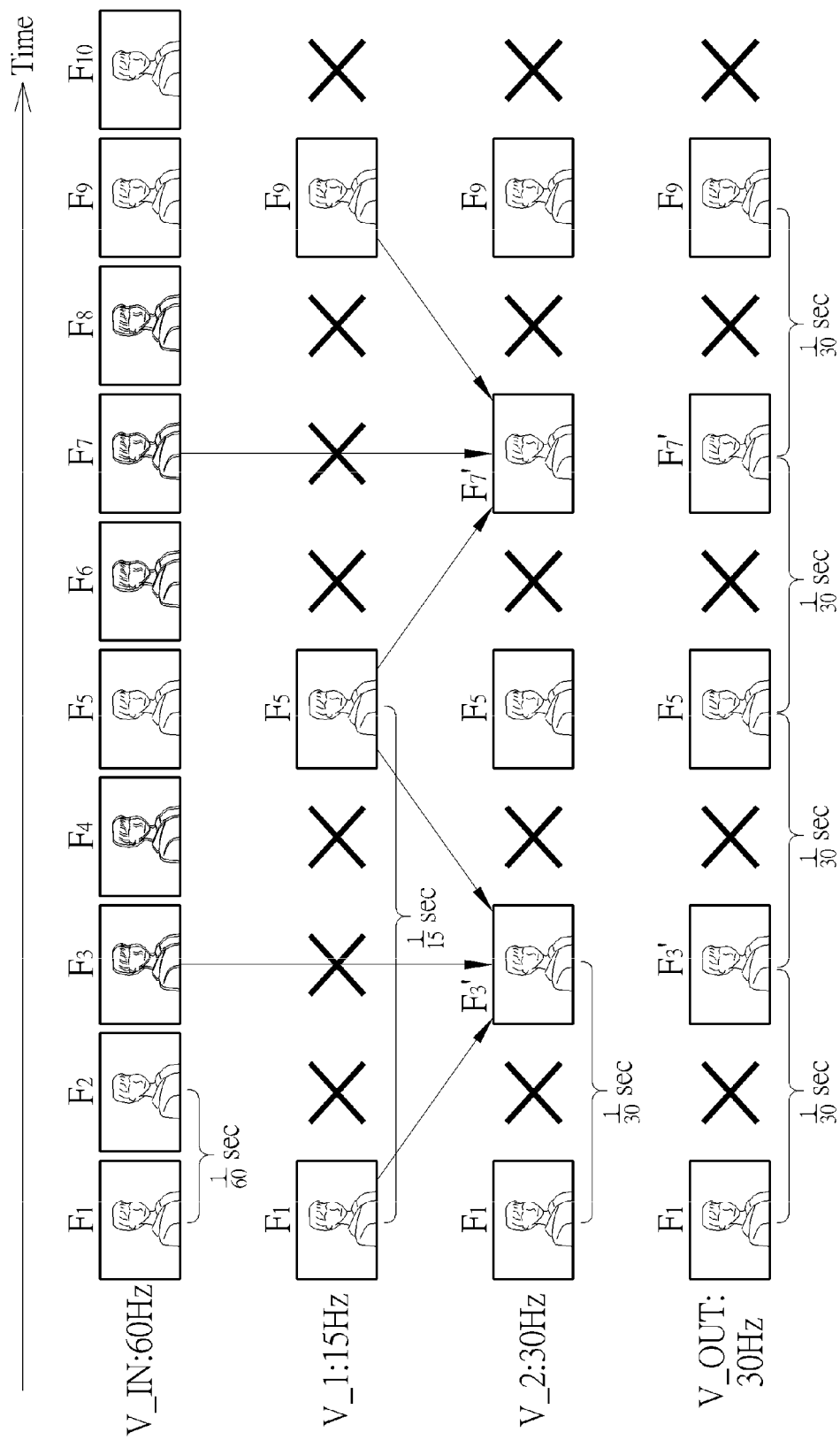
FIG. 9 is a diagram illustrating a second video recording example based on the proposed video recording apparatus shown in FIG. 7.

FIG. 9 is a diagram illustrating a second video recording example based on the proposed video recording apparatus 600 shown in FIG. 7. In this example, the input circuit 602 generates the first video sequence V_1 by periodically selecting one video frame from the input video sequence V_IN, where the input video sequence V_IN is composed of consecutive video frames $F_1$-$F_{10}$, and the first video sequence V_1 is composed of selected video frames $F_1$, $F_5$, $F_9$. More specifically, in every four consecutive video frames of the input video sequence V_IN, the first video frame is selected and remaining video frames are dropped/unselected. As the frame rate of the input video sequence V_IN is 60 Hz, the frame rate of the first video sequence V_1 would be 15 Hz due to the periodical video frame selection. It should be noted that the frame rate of the first video sequence V_1 is lower than the target frame rate of the output video sequence V_OUT. Hence, the interpolation circuit 604 performs video frame interpolation upon the first video sequence V_1 to generate the second video sequence V_2 with a frame rate equal to the target frame rate (e.g., 30 Hz). In one exemplary design, the video frame $F_3'$ is interpolated based on at least one of the adjacent selected video frames $F_1$ and $F_5$ in the first video sequence V_1, and the video frame $F_7'$ is interpolated based on at least one of the adjacent selected video frames $F_5$ and $F_9$ in the first video sequence V_1. It should be noted that the video frame interpolation may adjust the weighting factors of the referenced video frames to obtain an interpolated video frame with good quality. In another exemplary design, the video frame $F_3'$ is interpolated based on at least one video frame (e.g., $F_3$) in the input video sequence V_IN and at least one video frame (e.g., $F_1$ and/or $F_5$) in the first video sequence V_1, and the video frame $F_7'$ is interpolated based on at least one video frame (e.g., $F_7$) in the input video sequence V_IN and at least one video frame (e.g., $F_5$ and/or $F_9$) in the first video sequence V_1. As the video frame $F_3/F_7$ in the input video sequence V_IN (i.e., the original image content captured at the image capture timing to which the video frame $F_3/F_7$ corresponds) is referenced, the video frame $F_3'/F_7'$ may have better quality. In yet another exemplary design, an extrapolation algorithm may be employed by the interpolation circuit 604 to create the video frames $F_3'$ and $F_7'$ based on an available video frame in the first video sequence V_1. For example, the interpolation circuit 604 derives the video frame $F_3'$ from the video frame $F_1$ (when a real-time or non-real-time manner is employed) or the video frame $F_5/F_9$ (when a non-real-time manner is employed). Similarly, the interpolation circuit 604 derives the video frame $F_7'$ from the video frame $F_1/F_5$ (when a real-time or non-real-time manner is employed) or the video frame $F_9$ (when a non-real-time manner is employed). Next, the output circuit 606 records the second video sequence V_2 as the output video sequence V_OUT. In this way, the output video sequence V_OUT with better quality is generated due to the video frame interpolation.

Figure 10:
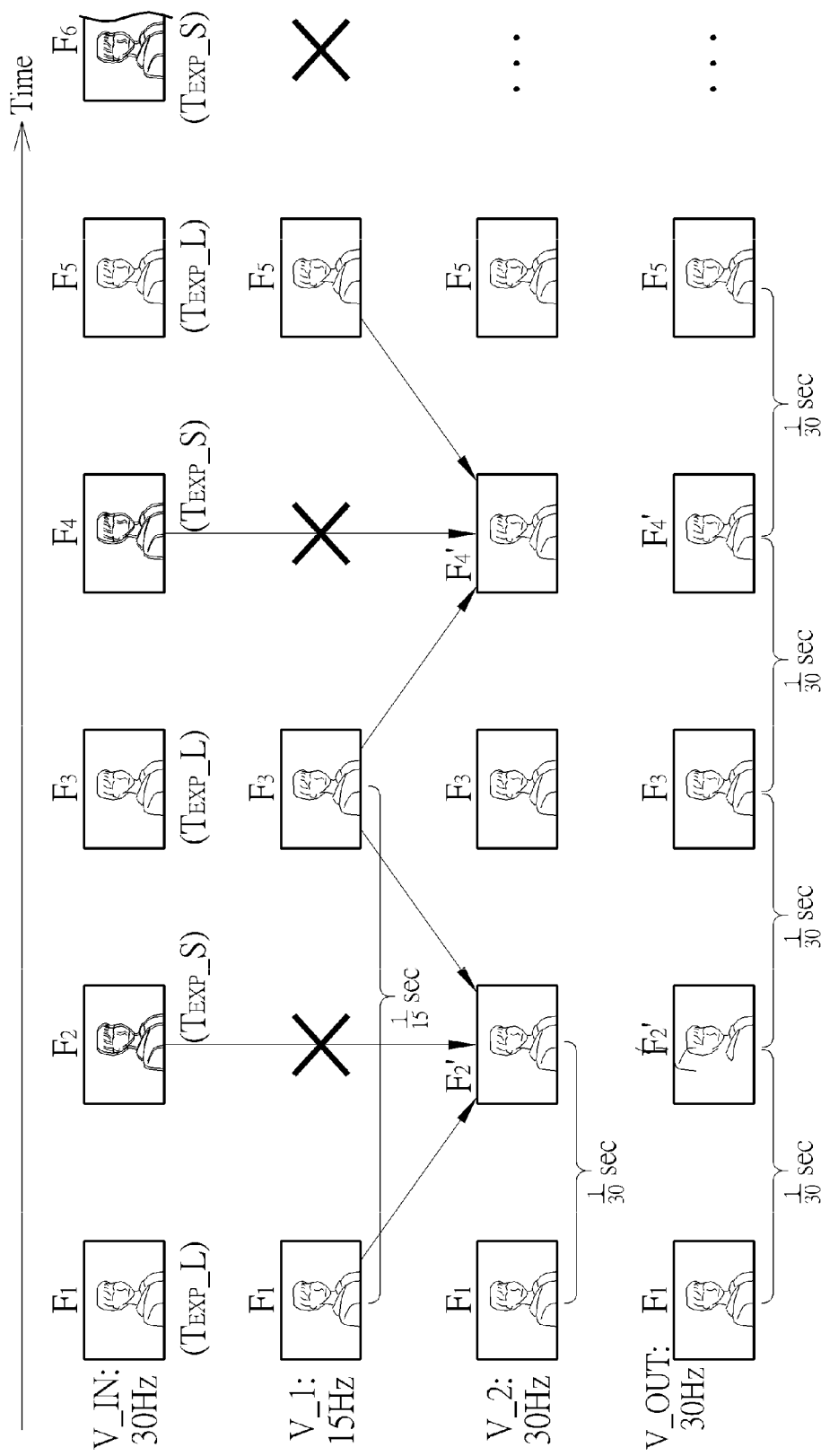
FIG. 10 is a diagram illustrating a third video recording example based on the proposed video recording apparatus shown in FIG. 7.

The controller 608 may control the image capture module 101 to use the same image capture setting for generating each video frame included in the input video sequence V_IN. However, this is not meant to be a limitation of the present invention. In an alternative design, the controller 608 may control the image capture module 101 to use different image capture settings for generating video frames included in the input video sequence V_IN. That is, one video frame (e.g., a selected video frame) included in the input video sequence V_IN is generated from the image capture module 101 using a first image capture setting (e.g., a longer exposure time), and another video frame (e.g., a dropped/unselected video frame) included in the input video sequence V_IN is generated from the image capture module 101 using a second image capture setting (e.g., a shorter exposure time) which is different from the first image capture setting. By way of example, but not limitation, the image capture 101 is controlled by the controller 608 to periodically generate one video frame by using the first image capture setting and further periodically generate one video frame by using the second image capture setting. FIG. 10 is a diagram illustrating a third video recording example based on the proposed video recording apparatus 600 shown in FIG. 7. The frame rate of the input video sequence V_IN is equal to the target frame rate of the output video sequence V_OUT. In this example, the controller 608 controls the image capture module 101 to generate each of the video frames $F_1$, $F_3$, and $F_5$ by using a longer exposure time $T_{Exp\_}L$, and further controls the image capture module 101 to generate each of the video frames $F_2$, $F_4$, and $F_6$ by using a shorter exposure time $T_{Exp\_}S$. Hence, the input video sequence V_IN with the frame rate of 30 Hz is generated from the image capture module 101. After receiving the input video sequence V_IN composed of video frames $F_1$-$F_6$, the input circuit 602 generates the first video sequence V_1 by periodically selecting one video frame from the input video sequence V_IN. In this example, the frame rate of the first video sequence V_1 is 15 Hz since the periodical selection selects odd-numbered video frames and drops even-numbered video frames. As a person skilled in the art can readily understand the following operations after reading above paragraphs directed to the example shown in FIG. 9, further description is omitted here for brevity.

Figure 11:
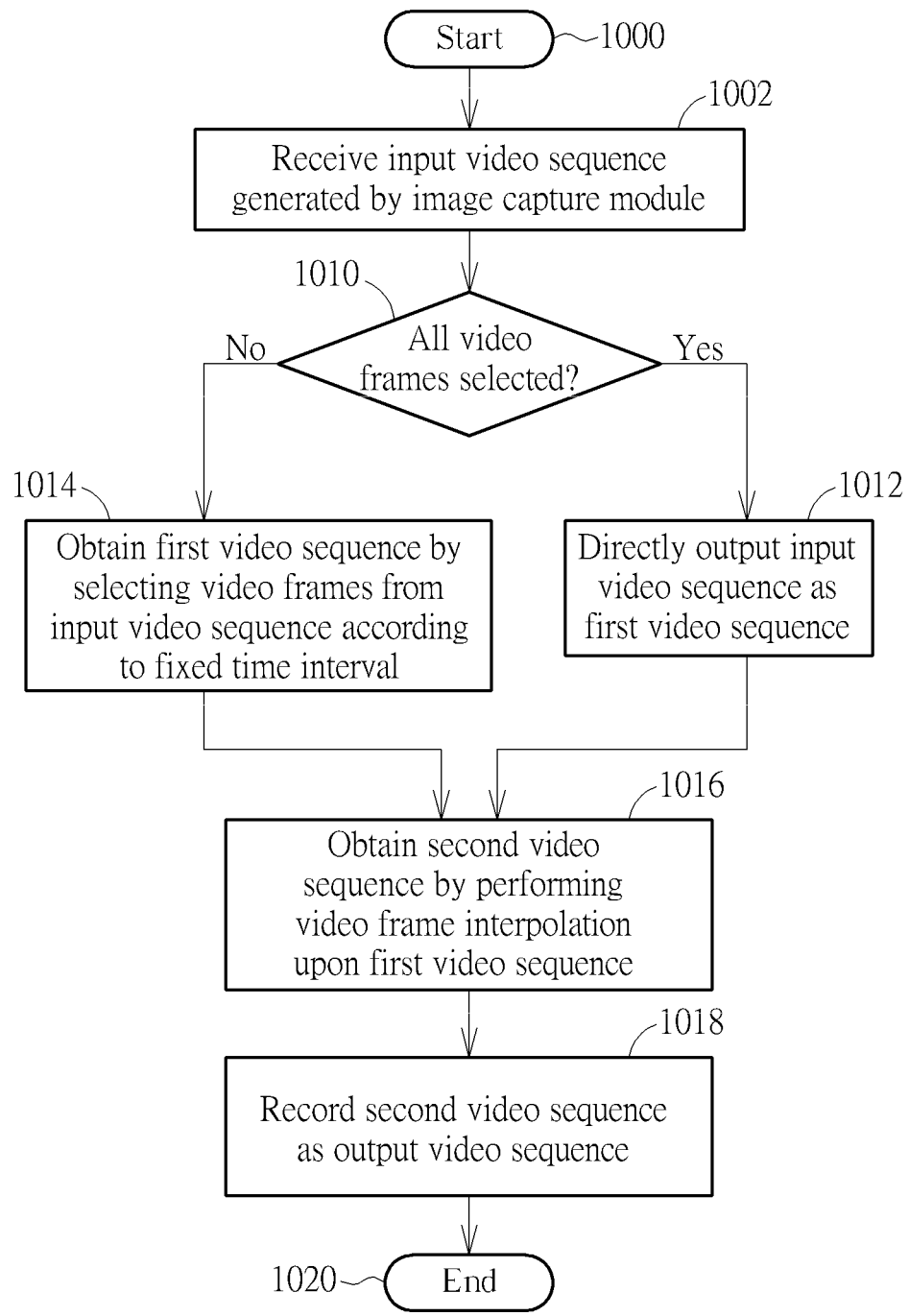
FIG. 11 is a flowchart illustrating another video recording method of recording an output video sequence for an image capture module according to an embodiment of the present invention.

FIG. 11 is a flowchart illustrating another video recording method of recording an output video sequence for an image capture module according to an embodiment of the present invention. The video recording method may be employed by the video recording apparatus 600 shown in FIG. 7. Provided that the result is substantially the same, the steps are not required to be executed in the exact order shown in FIG. 11. The video recording method may include following steps.

Step 1000: Start.

Step 1002: Receive the input video sequence V_IN generated by the image capture module 101.

Step 1010: Check if all video frames in the input video sequence V_IN should be selected. If yes, go to step 1012; otherwise, go to step 1014.

Step 1012: Directly output the input video sequence V_IN as the first video sequence V_1. Go to step 1016.

Step 1014: Obtain the first video sequence V_1 by selecting video frames from the input video sequence V_IN according to a fixed time interval (i.e., a periodical video frame selection).

Step 1016: Obtain the second video sequence V_2 by performing video frame interpolation upon the first video sequence V_1, wherein the frame rate of the second video sequence V_2 is higher than the frame rate of the first video sequence V_1.

Step 1018: Record the second video sequence V_2 as the output video sequence V_OUT.

Step 1020: End.

As a person skilled in the art can readily understand details of each step after reading above paragraphs directed to the video recording apparatus 600, further description is omitted here for brevity.

It should be noted that the video recording method shown in FIG. 11 is for illustrative purposes only, and is not meant to be a limitation of the present invention. That is, one or more steps in FIG. 11 may be omitted. For example, steps 1004, 1010, 1012, and 1014 may be omitted in a first alternative design such that step 1006 is performed immediately after step 1002; steps 1004, 1006, 1008, 1010, and 1014 may be omitted in a second alternative design such that step 1012 is performed immediately after step 1002; and steps 1004, 1006, 1008, 1010, and 1012 may be omitted in a third alternative design such that step 1014 is performed immediately after step 1002.

The video recording method shown in FIG. 11 may be performed in either a real-time manner or a non-real-time manner. In a case where the video recording method shown in FIG. 11 is performed in a real-time manner, each video frame (i.e., each captured image) generated from the image capture module 101 is immediately fed into the input circuit 602 of the video recording apparatus 600. The video recording apparatus 600 is properly designed to operate at a high processing speed. Hence, before the next video frame (i.e., the next captured image) is fed into the input circuit 602 of the video recording apparatus 600, the input circuit 602 would determine whether the current video frame should be selected or dropped, and the interpolation circuit 604 would determine whether an interpolated video frame should be generated.

In a case where the video recording method shown in FIG. 11 is performed in a non-real-time manner, video frames (i.e., captured images) generated from the image capture module 101 are temporarily stored in a camera buffer. Next, the buffered video frames (i.e., buffered captured images) are fed into the input circuit 602 of the video recording apparatus 600. The video recording apparatus 600 is allowed to operate at a lower processing speed due to the camera buffer. Besides, the video recording apparatus 600 may retrieve a batch of consecutive buffered video frames from the camera buffer. Therefore, the input circuit 602 outputs selected video frames according to these video frames read from the camera buffer. After the selected video frames are available, the interpolation circuit 604 starts generating interpolated video frames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video recording method of recording an output video sequence for an image capture module, comprising:

deriving a first video sequence from an input video sequence generated by the image capture module, wherein the first video sequence is composed of a plurality of video frames;

calculating an image quality metric value for each of the video frames of the first video sequence;
referring to the image quality metric value to select or drop each of the video frames of the first video sequence, and accordingly obtaining a second video sequence composed of selected video frames; and
generating the recorded output video sequence according to the second video sequence, comprising:
recording only a portion of the second video sequence in the output video sequence; and
obtaining a third video sequence by performing video frame interpolation upon the second video sequence, and recording at least a portion of the third video sequence as the output video sequence, wherein the video frame interpolation performed upon the second video sequence generates one video frame of the third video sequence by referring to at least one video frame of the first video sequence and at least one video frame of the second video sequence, and the at least one video frame of the first video sequence is not selected as a portion of the second video sequence.

2. The video recording method of claim 1, wherein the step of deriving the first video sequence comprises:
obtaining the first video sequence by performing video frame interpolation upon the input video sequence, wherein a frame rate of the first video sequence is higher than a frame rate of the input video sequence.

3. The video recording method of claim 1, wherein the step of calculating the image quality metric value comprises:
determining the image quality metric value by evaluating a sharpness value or a blur value of each of the video frames.

4. The video recording method of claim 1, wherein the step of calculating the image quality metric value comprises:
determining the image quality metric value according to a sensor input generated from a sensor distinct from the image capture module.

5. A video recording method of recording an output video sequence for an image capture module, comprising:
deriving a first video sequence from an input video sequence generated by the image capture module;
obtaining a second video sequence by performing video frame interpolation upon the first video sequence derived from the input video sequence, wherein a frame rate of the second video sequence is higher than a frame rate of the first video sequence; and
directly recording the second video sequence as the output video sequence;
wherein the video recording method further comprises:
generating the input video sequence by intentionally lowering an image capture rate of the image capture module to be lower than a target frame rate of the output video sequence and to be lower than the image capture rate of the image capture module under a normal video recording mode; and
wherein the step of deriving the first video sequence from the input video sequence comprises:
obtaining the first video sequence by periodically selecting one video frame from the input video sequence, wherein a frame rate of the input video sequence is higher than the frame rate of the first video sequence, wherein each selected video frame included in the input video sequence is generated by the image capture module using a first image capture setting, and each dropped video frame included in the input video sequence is generated from the image capture module using a second image capture setting which is different from the first image capture setting.

6. The video recording method of claim 5, wherein the video frame interpolation performed upon the first video sequence generates one video frame of the second video sequence by referring to at least one video frame of the first video sequence and at least one video frame of the input video sequence.

7. A video recording apparatus of recording an output video sequence for an image capture module, comprising:
an input circuit, arranged for deriving a first video sequence from an input video sequence generated by the image capture module, wherein the first video sequence is composed of a plurality of video frames of the first video sequence;
an image quality estimation circuit, arranged for calculating an image quality metric value for each of the video frames;
a selection circuit, arranged for referring to the image quality metric value to select or drop each of the video frames of the first video sequence, and accordingly obtaining a second video sequence composed of selected video frames; and
an output circuit, arranged for generating the recorded output video sequence according to the second video sequence;
wherein the output circuit records only a portion of the second video sequence in the output video sequence; and
wherein the output circuit obtains a third video sequence by performing video frame interpolation upon the second video sequence, and records at least a portion of the third video sequence as the output video sequence, where the video frame interpolation performed upon the second video sequence generates one video frame of the third video sequence by referring to at least one video frame of the first video sequence and at least one video frame of the second video sequence, and the at least one video frame of the first video sequence is not selected as a portion of the second video sequence.

8. The video recording apparatus of claim 7, wherein the input circuit obtains the first video sequence by performing video frame interpolation upon the input video sequence, where a frame rate of the first video sequence is higher than a frame rate of the input video sequence.

9. The video recording apparatus of claim 7, wherein the image quality estimation circuit determines the image quality metric value by evaluating a sharpness value or a blur value of each of the video frames.

10. The video recording apparatus of claim 7, wherein the image quality estimation circuit determines the image quality metric value according to a sensor input generated from a sensor distinct from the image capture module.

11. A video recording apparatus of recording an output video sequence for an image capture module, comprising:
an input circuit, arranged for deriving a first video sequence from an input video sequence generated by the image capture module;
an interpolation circuit, arranged for obtaining a second video sequence by performing video frame interpolation upon the first video sequence derived from the input video sequence, wherein a frame rate of the second video sequence is higher than a frame rate of the first video sequence; and
an output circuit, arranged for directly recording the second video sequence as the output video sequence;

wherein the video recording apparatus further comprises:
a controller, arranged for controlling the image capture module to intentionally lower an image capture rate to be lower than a target frame rate of the output video sequence and to be lower than the image capture rate of the image capture module under a normal video recording mode and to generate the input video sequence according to the lowered image capture rate; and wherein the input circuit obtains the first video sequence by periodically selecting one video frame from the input video sequence, wherein a frame rate of the input video sequence is higher than the frame rate of the first video sequence, each selected video frame included in the input video sequence is generated by the image capture module using a first image capture setting, and each dropped video frame included in the input video sequence is generated from the image capture module using a second image capture setting which is different from the first image capture setting.

12. The video recording apparatus of claim 11, wherein the video frame interpolation performed upon the first video sequence generates one video frame of the second video sequence by referring to at least one video frame of the first video sequence and at least one video frame of the input video sequence.

* * * * *